United States Patent
Robinson

(10) Patent No.: US 9,229,407 B1
(45) Date of Patent: Jan. 5, 2016

(54) SYSTEM AND METHOD FOR OPTIMAL INK LIMITING ON MULTI-PASS CLEAR JOBS

(71) Applicant: Xerox Corporation, Norwalk, CT (US)

(72) Inventor: David C. Robinson, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/595,900

(22) Filed: Jan. 13, 2015

(51) Int. Cl.
*G03G 15/00* (2006.01)
*G03G 15/08* (2006.01)
*G03G 15/32* (2006.01)
*G03G 15/36* (2006.01)

(52) U.S. Cl.
CPC .............. *G03G 15/55* (2013.01); *G03G 15/556* (2013.01); *G03G 15/0863* (2013.01); *G03G 15/32* (2013.01); *G03G 15/36* (2013.01); *G03G 15/5025* (2013.01); *G03G 15/5075* (2013.01); *G03G 15/5087* (2013.01)

(58) Field of Classification Search
CPC ... G03G 15/0863; G03G 15/32; G03G 15/36; G03G 15/5025; G03G 15/5075; G03G 15/5087; G03G 15/55; G03G 15/556; G03G 2215/0081; G03G 2215/00805; G03G 2215/0174; G03G 2215/0187; G03G 2215/048
See application file for complete search history.

(56) References Cited

U.S. PATENT DOCUMENTS

| | | | |
|---|---|---|---|
| 7,301,675 B2 | 11/2007 | Wang et al. | |
| 7,813,006 B2 | 10/2010 | Liu et al. | |
| 8,447,204 B2 | 5/2013 | Qiao et al. | |
| 8,477,376 B2 | 7/2013 | Robinson et al. | |
| 8,675,248 B2 | 3/2014 | Matsushita et al. | |
| 8,736,902 B2 | 5/2014 | Robinson et al. | |
| 8,761,532 B2 | 6/2014 | Farrell et al. | |
| 8,852,843 B2 | 10/2014 | Hirsch et al. | |
| 8,902,470 B2 | 12/2014 | Misaizu et al. | |
| 2012/0189776 A1 | 7/2012 | Robinson et al. | |
| 2012/0237243 A1* | 9/2012 | Yamamoto | G03G 15/6585 399/67 |
| 2013/0258367 A1* | 10/2013 | Saito | G06K 15/14 358/1.9 |

* cited by examiner

*Primary Examiner* — Joseph S Wong
(74) *Attorney, Agent, or Firm* — Gibb & Riley, LLC

(57) ABSTRACT

A print job is received into a print engine having an image processor. A page of the print job is analyzed for a color gamut and for clear toner. For multi-pass print jobs, toner usage per pixel for each color of the color gamut and the clear toner is determined. Adjusted pixel values for the clear toner are calculated using a predetermined percentage. Adjusted pixel values for the color toner are calculated for each color of the color gamut based on the maximum toner limit. A first layer of the page is rendered using the adjusted pixel values. Then, the adjusted pixel values are scaled for clear toner usage based on the predetermined percentage for the clear toner on the first pass using a tone reproduction curve. Subsequent layers of the page are rendered in selected passes using only the scaled pixel values for clear toner usage.

20 Claims, 5 Drawing Sheets

SYSTEM AND METHOD FOR OPTIMAL INK LIMITING ON MULTI-PASS CLEAR JOBS

BACKGROUND

Systems and methods herein generally relate to clear texturing, and more particularly, to clear texturing on a media substrate associated with a printing apparatus.

A substrate carries information in the form of images, graphics, and textual content. Oftentimes, the substrate carries additional information in the form of an identifier, such as an authenticating mark or a watermark. A first type of mark is selectively detectable. The mark is not viewable under casual inspection. Rather, a visual aid alters a viewing condition to make the mark viewable. An example of the first type of mark includes a fluorescent watermark. The fluorescent watermark may be made viewable when an illuminant alters a light condition used to control either toner or substrate reflection. A second type of mark is detectable under casual inspection. An example of the second type of mark may include a raised surface portion on the substrate. Another example may include an image rendered on the surface portion.

A colored or monochrome ink or toner is applied to the substrate to form the image. A lighter application of ink or toner is applied to the substrate as compared to a heavier application provided for the content. The lighter ink- or toner-application provides the mark with a generally washed out appearance. However, the image may still interfere with a viewer's ability to read the content also carried on the substrate. This difficulty is especially the case when a colored toner layer, used for the mark, is situated directly beneath the content layer. Accordingly, there is needed a new way of presenting marks. A mark is desired to include a generally transparent appearance. More particularly, a generally transparent mark is desired for casual inspection, whereby the mark includes a characteristic that makes it easily identifiable.

A use of clear toner on printed media sheets is becoming more diverse with newly discovered applications for using the clear toner as a way to achieve particular visible effects. For example, a layer of clear toner may provide the media sheet with a glossy appearance, or it may provide a textured image, that is supported on the media sheet, with a perceived third dimension. One aspect of using clear toner is an ability to produce certain effects while requiring less expensive manufacturing methods and substrate materials. As mentioned, texture is a desired visual effect that may be achieved using clear toner. For example, the use of clear toner on a generally uniform surface may provide the appearance of a third dimension when the toner (i.e., forming the image) is viewed relative to a blank region of the print media sheet. The reflective behavior of the clear toner may further contribute to the degree of the perceived dimension based on a reflection at select viewing angles. To further achieve a perceived textured surface having a noticeable tactile feel to a touch, the media sheet may be subjected to multiple passes through the image forming apparatus for building a clear toner layer having a certain pile height. Each pass may be used to render one coat of the clear toner layer. However, media sheet-degradation is associated with a conventional operation after a certain number of passes. The media sheet generally degrades as it is moved through a paper path. The media sheet may get caught in the paper path if the pile height of the clear toner layer is built too high. Accordingly, the caught media sheet may cause a jam to the image forming apparatus. The jam may decrease a production efficiency of the image forming apparatus if additional, queued print jobs are held until the jam is remedied and the apparatus is made operative again.

The current procedure for handling multiple pass clear is to RIP the page once. The color toner and clear toner are applied on the first pass. Clear toner only is applied on subsequent passes. In order to use 100% clear toner, the color planes are reduced to enable 100% on the clear plane. This leads to a chromatic deficiency on the color printing as compared to printing color without clear toner. What is needed is a system that enables optimal color printing on the first pass with optimal (100%) clear printing on subsequent passes.

SUMMARY

A printing apparatus is disclosed. The printing apparatus includes a printing device and a controller operatively connected to the printing device. The controller is configured to execute computer readable instructions that when executed, perform a method of printing clear texturing on a media substrate associated with the printing device.

According to exemplary methods herein, a print job is received into a print engine comprising an image processor. The print engine uses a standard color gamut and a clear toner. The image processor analyzes a page of the print job for the standard color gamut and for the clear toner. According to the analysis the number of passes of the page through the print engine is determined for the print job. For print jobs having more than one pass, toner usage per pixel for each color of the color gamut and the clear toner is determined. Adjusted pixel values for clear toner usage per pixel are calculated using a predetermined percentage. Adjusted pixel values for color toner usage per pixel are calculated for each color of the color gamut based on maximum toner limit while retaining the predetermined percentage of clear toner. A first layer of the page of the print job is rendered on a media sheet in a first pass using the adjusted pixel values for the clear toner usage and the adjusted pixel values for the color toner usage. For print jobs having more than one pass, scaled pixel values for clear toner usage are determined by scaling the adjusted pixel values for clear toner usage based on the predetermined percentage for clear toner usage on the first pass using a tone reproduction curve. Subsequent layers of the page of the print job are rendered on the media sheet in a select pass using only the scaled pixel values for clear toner usage.

According to exemplary methods herein, an original print job description is received. The original print job description comprises multiple channels including a clear channel and a color channel. The original print job indicates multi-pass operation. Image processing is performed on the print job description to generate a ready-to-print file. According to the image processing toner usage per pixel is determined for the color channel and the clear channel. Adjusted pixel values are calculated for the clear channel using a predetermined percentage of clear toner. Adjusted pixel values are calculated for the color channel based on maximum toner limit while retaining the predetermined percentage of clear toner. A first layer of an image is rendered on a media sheet in a first pass using the adjusted pixel values for the clear channel and the adjusted pixel values for the color channel. Pixel values of the color channel are subsequently modified to zero. Pixel values for the clear channel are modified by scaling the adjusted pixel values for the clear channel based on the predetermined percentage for clear toner on the first pass using a tone reproduction curve. A modified ready-to-print file is generated using modified pixel values of the color channel and modified pixel values of the clear channel. The modified ready-to-print file is saved in a modified ready-to-print format. Subsequent layers of the image are rendered on the media sheet in a select pass using only the clear channel with highest percentage of clear possible according to the modified ready-to-print format.

According to printing systems herein, a processor processes a print job according to an original print job description. The processor comprises an image processor component. The original print job description comprises multiple channels including a clear channel and a color channel. A print engine is connected to the image processor. The print engine comprises a pigmented toner-applying component rendering a color layer on a media sheet and a clear toner-applying component rendering a clear layer on the media sheet. The image processor component determines toner usage per pixel for the color channel and the clear channel. The image processor component calculates adjusted pixel values for the clear channel by a predetermined percentage of clear toner. The image processor component calculates adjusted pixel values for the color channel based on maximum toner limit while retaining the predetermined percentage of clear toner. The processor processes instructions of the original print job description modifying pixel values of the color channel to zero and modifying pixel values for the clear channel by scaling the adjusted pixel values for the clear channel based on the predetermined percentage for clear toner on the first pass using a tone reproduction curve after an image is rendered onto the media sheet using the print engine according to the original print job description.

According to a computer system for optimal ink limiting on multi-pass clear jobs, the computer system comprises a program product comprising a tangible computer readable storage medium having program code embodied therewith. The program code is readable and executable by a computer to provide an application to perform a method. According to the method, a print job is received into a print engine comprising an image processor. The print engine uses a standard color gamut and a clear toner. The image processor analyzes a page of the print job for the standard color gamut and for the clear toner. According to the analysis the number of passes of the page through the print engine is determined for the print job. For print jobs having more than one pass, toner usage per pixel for each color of the color gamut and the clear toner is determined. Adjusted pixel values for clear toner usage per pixel are calculated using a predetermined percentage. Adjusted pixel values for color toner usage per pixel are calculated for each color of the color gamut based on maximum toner limit while retaining the predetermined percentage of clear toner. A first layer of the page of the print job is rendered on a media sheet in a first pass using the adjusted pixel values for the clear toner usage and the adjusted pixel values for the color toner usage. For print jobs having more than one pass, scaled pixel values for clear toner usage are determined by scaling the adjusted pixel values for clear toner usage based on the predetermined percentage for clear toner usage on the first pass using a tone reproduction curve. Subsequent layers of the page of the print job are rendered on the media sheet in a select pass using only the scaled pixel values for clear toner usage.

These and other features are described in, or are apparent from, the following detailed description.

BRIEF DESCRIPTION OF THE DRAWINGS

Various examples of the systems and methods are described in detail below, with reference to the attached drawing figures, which are not necessarily drawn to scale and in which.

DETAILED DESCRIPTION

Figure 1:
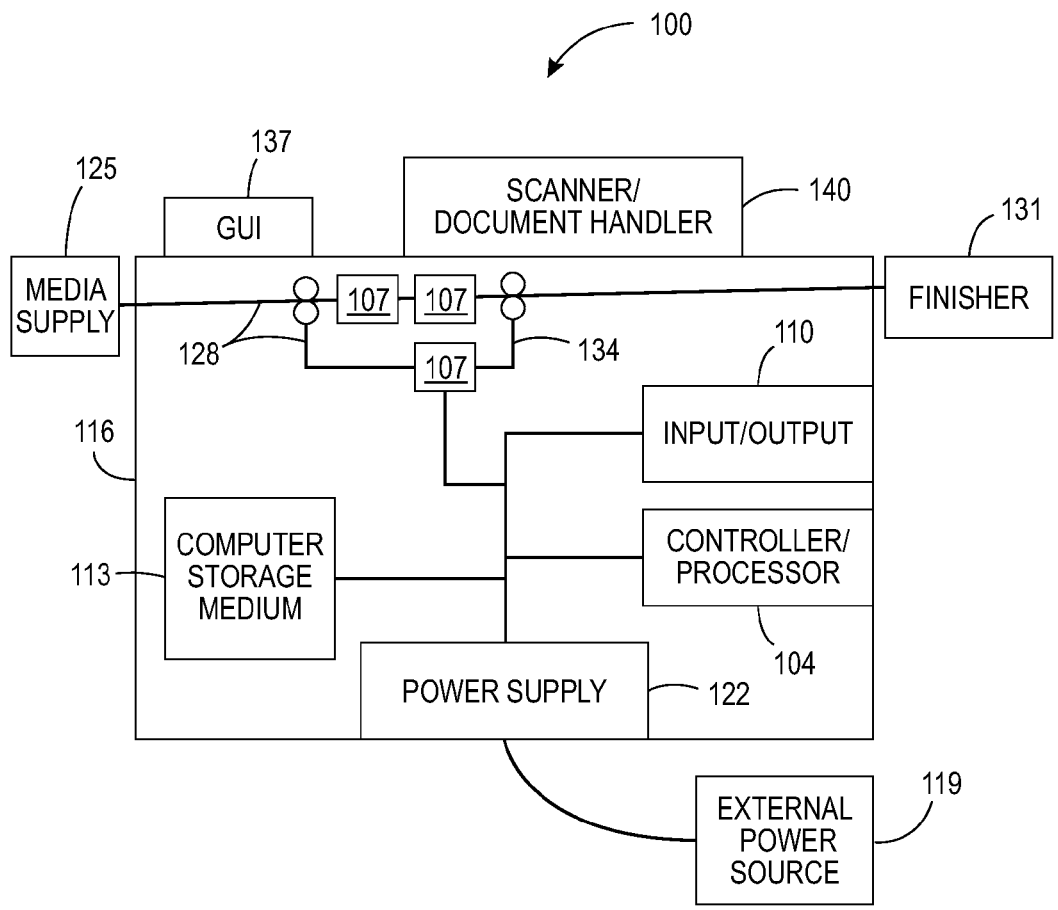
FIG. 1 is a side-view schematic diagram of a multi-function device according to systems and methods herein.

For a general understanding of the features of the disclosure, reference is made to the drawings. In the drawings, like reference numerals have been used throughout to identify identical elements. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

With the advent of "clear" toner and ink and machines capable of printing clear inks in addition to black and colors, new options are available to users of printing systems. The color gamut of a printer is a multi-dimensional space of a given volume with the axes of the space being set or defined initially by the pigments used in the colorants of the primary colors. Each set of color primaries: red, green, blue (RGB) or cyan, magenta, yellow, and black (CMYK), defines a "color space" that includes all colors that can result from any combination of these primaries. The "color space," or "color gamut," may be quite different for different sets of primaries. In forming multi-color output images on an image-receiving medium, each of the primary colors is transferred to the image-receiving medium in turn. The color gamut is defined by the interaction of the primary colors, and is limited by a total amount of colorant in any combination that can be effectively deposited on the image-receiving medium. In other words, it is not possible to print some colors that can be photographed or displayed on a monitor when using CMYK printing. The color gamut for a particular image forming device and an associated color rendition dictionary (CRD) by which images may be produced by the image forming device is usually stored in metadata with the image forming device. The CRD and associated set of set points programmed into the image forming device, or family of image forming devices, ensures that the color gamut produced by that image forming device covers, as broadly as possible, an available standard color spectrum. Typically then, image forming devices are delivered with a single CRD available in the image production system.

In particular, and according to aspects of this disclosure, texture effects can be added to printed materials. By printing a clear toner pattern over the top of a color image a unique texture or 3D effect can be added. According to one example of this disclosure, a system is provided in which a machine operator selects a texture or set of textures that are applied to select regions or objects on a page. A variety of attributes may be programmed by the operator using a clear pattern GUI (Graphical User Interface). Once the setup is complete, a full-page clear color plane image is created and submitted along with the print job to an image processor. The image processor in turn decomposes the color image along with the clear image and creates a multi-plane bitmap. The number of planes being equal to the number of primary colors in the selected gamut (four for CMYK or five for CMYK with an extension color) plus one for the clear plane.

An incoming print job includes a PDL file that describes the appearance of a printed page according to the job. The input may be a page description using a page description language (PDL). A page description language (PDL) is a computer language that describes for the print engine the appearance of a printed page in a higher level than an actual output bitmap. The PDL file specifies the arrangement of the printed page through commands for the print engine. Clear toner allows the ability to create a unique IQ (Image Quality) effect when added to a color printed page. A clear toner system enables the association of clear texturing with object types/pages. A default set of textures can be made available for operator selection. Furthermore, operators can also import or create textures. The textures are applied by building, for example, via a decomposer, a clear image plane from the texture. The texture is applied on the proper portion of the incoming PDL pages via mask and merge functionality in the decomposer.

As used herein, an image forming device can include any device for rendering an image on print media, such as a copier, laser printer, bookmaking machine, facsimile machine, or a multifunction machine (which includes one or more functions such as scanning, printing, archiving, emailing, and faxing). "Print media" can be a physical sheet of paper, plastic, or other suitable physical print media substrate for carrying images. A "print job" or "document" is referred to for one or multiple sheets copied from an original print job sheet(s) or an electronic document page image, from a particular user, or otherwise related. An original image is used herein to mean an electronic (e.g., digital) or physical (e.g., paper) recording of information. In its electronic form, the original image may include image data in a form of text, graphics, or bitmaps.

Referring now to the drawings, and more specifically to FIG. 1, what is illustrated is an exemplary multi-function device (MFD) 100, which can be used with methods herein. The MFD 100 includes a controller/processor 104 and at least one marking device (print engine(s)) 107 operatively connected to the controller/processor 104. The MFD 100 may also include a communications port (Input/Output device 110) operatively connected to the controller/processor 104 and to a computerized network external to the MFD 100. The Input/Output device 110 may be used for communications to and from the MFD 100.

The controller/processor 104 controls the various actions of the MFD 100, as described below. A non-transitory computer storage medium device 113 (which can be optical, magnetic, capacitor based, etc.) is readable by the controller/processor 104 and stores instructions that the controller/processor 104 executes to allow the MFD 100 to perform its various functions, such as those described herein.

According to systems and methods herein, the controller/processor 104 may comprise a special purpose processor that is specialized for processing image data and includes a dedicated processor that would not operate like a general purpose processor because the dedicated processor has application specific integrated circuits (ASICs) that are specialized for the handling of image processing operations, processing image data, calculating pixel values, etc. In one example, the multi-function device 100 is special purpose machine that includes a specialized image processing card having unique ASICs for providing clear image processing, includes specialized boards having unique ASICs for input and output devices to speed network communications processing, a specialized ASIC processor that performs the logic of the methods described herein using dedicated unique hardware logic circuits, etc. It is contemplated that the controller/processor 104 may comprise a raster image processor (RIP). A raster image processer uses the original image description to RIP the print job. Accordingly, the print instruction data is converted to a printer-readable language. The print job description is generally used to generate a ready-to-print file. The ready-to-print file may be a compressed file that can be repeatedly accessed for multiple (and subsequent) passes.

Thus, as shown in FIG. 1, a body housing 116 has one or more functional components that operate on power supplied from an external power source 119, which may comprise an alternating current (AC) power source, through the power supply 122. The power supply 122 can comprise a power storage element (e.g., a battery) and connects to the external power source 119. The power supply 122 converts the power from the external power source 119 into the type of power needed by the various components of the MFD 100.

The multi-function device 100 herein has a media supply 125 supplying media to a media path 128. The media path 128 can comprise any combination of belts, rollers, nips, drive wheels, vacuum devices, air devices, etc. The print engine 107 is positioned along the media path 128. That is, the multi-function device 100 comprises a document-processing device having the print engine 107. The print engine 107 prints marks on the media. After receiving various markings from the print engine(s) 107, the sheets of media can optionally pass to a finisher 131 which can fold, staple, sort, etc., the various printed sheets. As described herein, a return paper path 134 may deliver the printed sheets to the same or different print engine 107 for at least a second layer of toner to be applied. Each return of the media to the print engine 107 is referred to herein as a "pass".

The print engine(s) 107 may include a color toner applying component (i.e., a source of pigmented toner) that supplies at least pigmented colorant for applying colored toner to the media passing through the print engine 107. Additionally, the print engine(s) 107 may include a clear toner applying component that supplies clear toner for applying to the media passing through the print engine 107.

In addition, the multi-function device 100 can include at least one accessory functional component, such as a graphic user interface (GUI) assembly 137 or other accessory functional component (such as a scanner/document handler 140, automatic document feeder (ADF), etc.) that operate on the power supplied from the external power source 119 (through the power supply 122). A user can input a desired number of clear toner passes on the GUI.

As would be understood by those ordinarily skilled in the art, the multi-function device 100 shown in FIG. 1 is only one example and the systems and methods herein are equally applicable to other types of devices that may include fewer components or more components. For example, while a limited number of print engines and media paths are illustrated in FIG. 1, those ordinarily skilled in the art would understand that many more paper paths and additional print engines could be included within any device used with embodiments herein.

Thus, an image input device is any device capable of obtaining color pixel values from a color image. The set of image input devices is intended to encompass a wide variety of devices such as, for example, digital document devices, computer systems, memory and storage devices, networked platforms such as servers and client devices which can obtain pixel values from a source device. An image output device is any device capable of rendering the image. The set of image output devices includes digital document reproduction equipment and other copier systems as are widely known in commerce, photographic production and reproduction equipment, monitors and other displays, computer workstations and servers, including a wide variety of color marking devices, and the like. To render an image is to reduce the image data (or a signal thereof) to viewable form; store the image data to memory or a storage device for subsequent retrieval; or communicate the image data to another device. Such communication may take the form of transmitting a digital signal of the image data over a network.

When a job requiring clear multi-pass is detected (via job ticket, queue settings, etc.), the job/pages are initially processed by the controller/processor 104 using a predefined ink limit (e.g., 260%) applied to maximize colorant usage while retaining a selected percentage of clear. The clear plane is RIPed proportionally to 100% clear—(e.g., if the ink limit for clear is 10%, a 100% clear call will be mapped to 10%, a 50% clear call mapped to 5%, etc.). For subsequent passes only the clear plane content is transferred to the print engine 107. The clear plane content is scaled based on the ink limit percentage for clear on the first pass—(i.e., if the ink limit was 10%, 10% values will be scaled to 100%, 5% to 50%, etc.). The scaling may be accomplished using a tone reproduction curve developed for the various colorants. It is contemplated that subsequent passes may use 100% clear for each pass.

Figure 2:
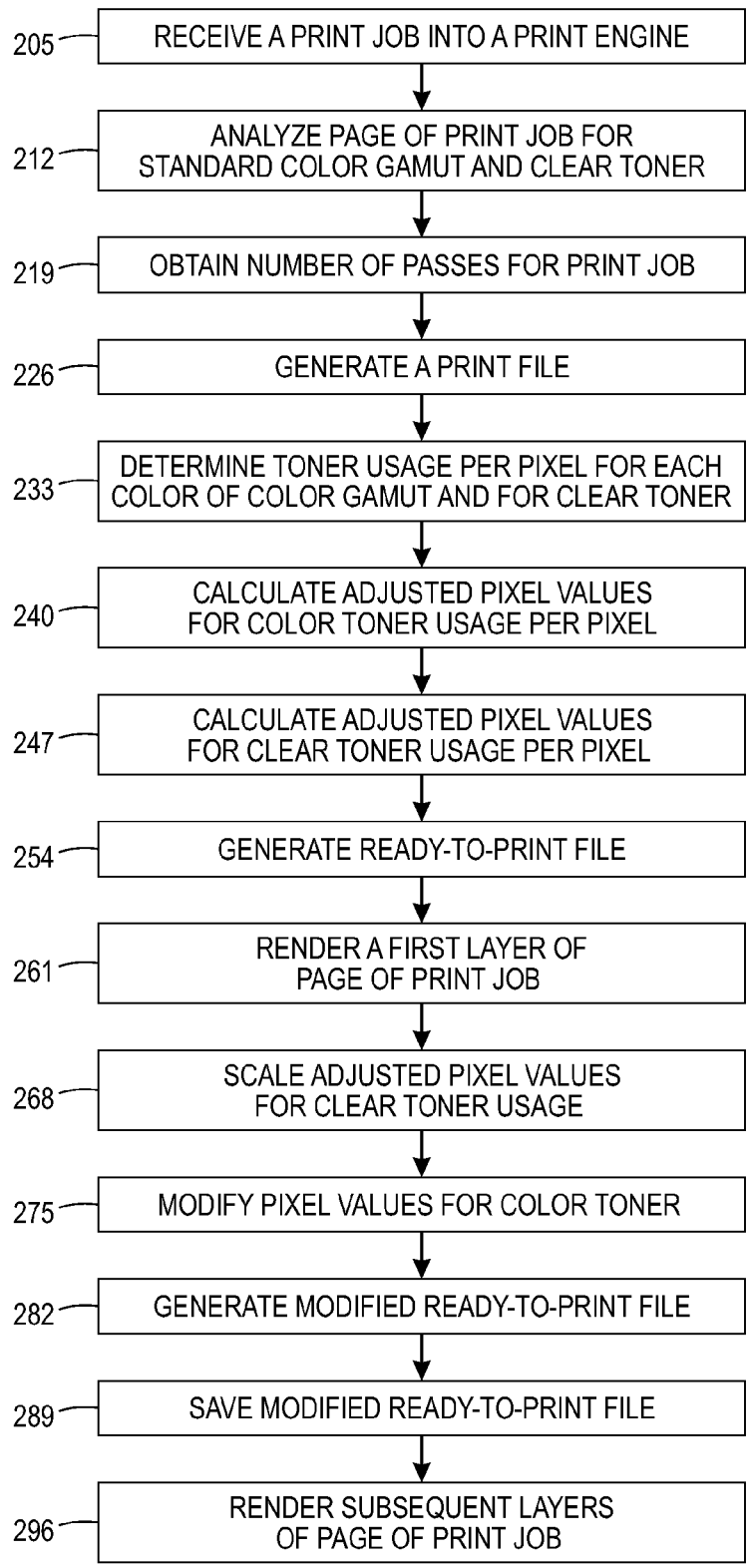
FIG. 2 is a flow diagram illustrating methods herein.

FIG. 2 is a flow diagram illustrating the processing flow of an exemplary method according to the present disclosure. The method is useful for optimal ink limiting on multi-pass clear jobs. At 205, a print job is received into a print engine comprising an image processor. The print engine uses a color gamut and a clear toner. The image processor analyzes a page of the print job for the color gamut and for the clear toner, at 212. The number of passes of the page through the print engine is obtained for the print job, at 219. The number of passes may be a user input number. The image processing generates a print file, at 226. For print jobs having more than one pass, toner usage per pixel for each color of the color gamut and the clear toner is determined, at 233. At 240, adjusted pixel values for clear toner usage per pixel are calculated using a predetermined percentage. (Note: in the first pass, the predetermined percentage may be 0%.) At 247, adjusted pixel values for color toner usage per pixel are calculated for each color of the color gamut based on maximum toner limit while retaining the predetermined percentage of clear toner. A ready-to-print file is generated, at 254, and sent to the print engine. At 261, a first layer of the page of the print job is rendered on a media sheet in a first pass using the adjusted pixel values for the clear toner usage and the adjusted pixel values for the color toner usage. For print jobs having more than one pass, scaled pixel values for clear toner usage are determined by scaling the adjusted pixel values for clear toner usage, at 268. The adjusted pixel values for clear toner usage are scaled based on the predetermined percentage for clear toner usage on the first pass using a tone reproduction curve. Pixel values for the color toner are modified to zero, at 275. At 282, a modified ready-to-print file is generated using modified pixel values of the color channel and modified pixel values of the clear channel. At 289, the modified ready-to-print file is saved in a modified ready-to-print format, and sent to the print engine. Subsequent layers of the image are rendered on the page, at 296, in a select pass using only the clear toner according to the modified ready-to-print format.

In other words, when the CDF (common decomposer facility) detects the attribute of clear passes being more than one, the following actions occur:

- At RIP time the ink limit is applied such that only a selected percentage is allocated to the clear plane. The RIP also scales down clear values by the same percentage.
- The ink limit is applied to the plane data for each color before being saved in compressed format (e.g., xm2).
- The interface between the controller/processor and the print engine(s) also is aware of the number of clear passes requested and the number of passes completed.
- When a job is multi-pass, those passes after the first use only the clear plane data (color planes are not sent to the print engine).
- Also on passes after the first pass a tone reproduction curve (TRC) may be applied to the clear plane before submission to the print engine(s).

Figure 3:
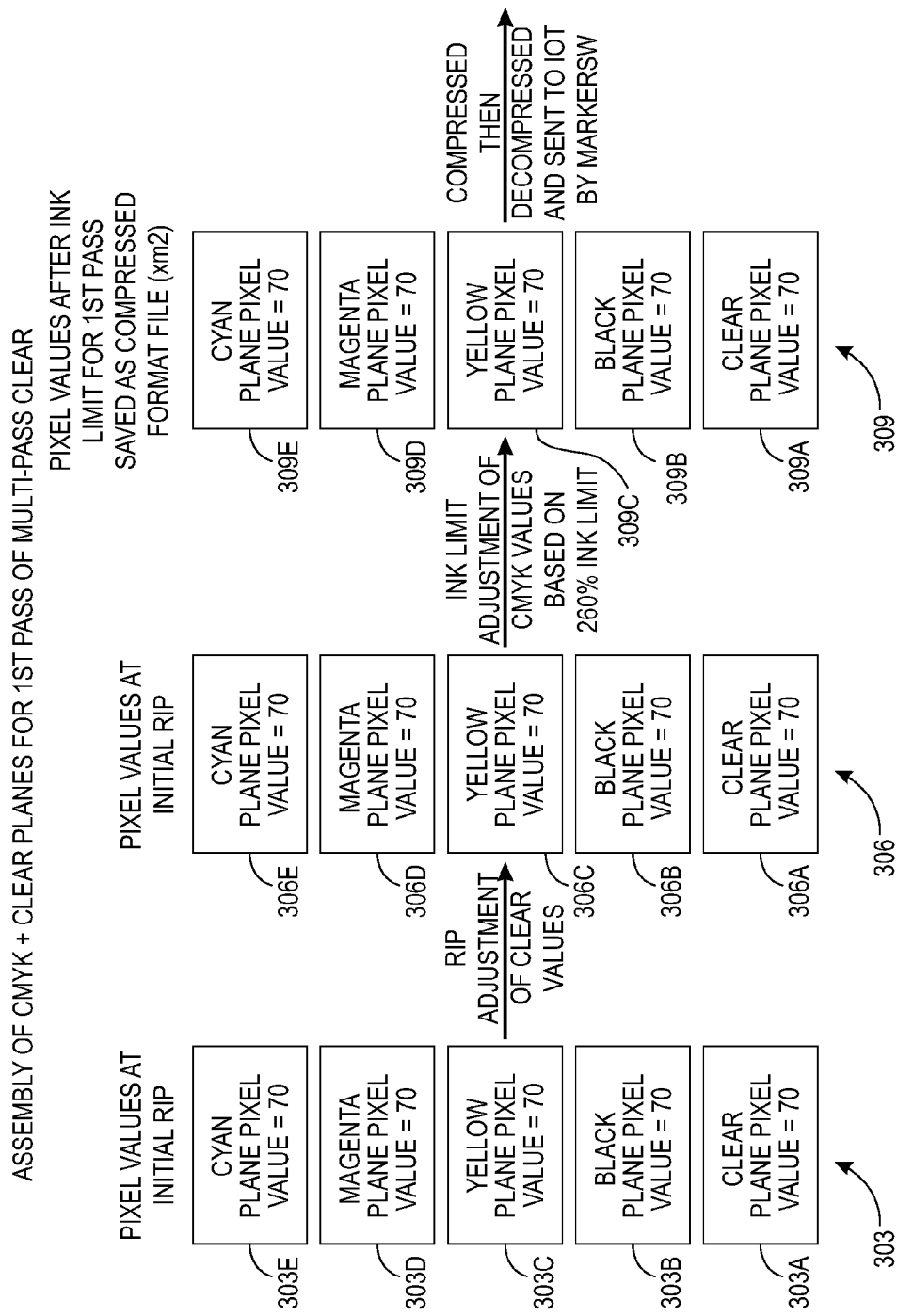
FIG. 3 is an illustration of the assembly of color and clear planes for a first pass of an image according to systems and methods herein.

FIG. 3 illustrates an example of assembly of the color planes for a CMYK color gamut and a clear plane. In the illustrated example, the image processor is a raster image processor; it is contemplated that other image processors may be used. As shown in the first column in FIG. 3, as indicated at 303, initial RIP of the image, pixel values are determined for each color plane and the clear plane (303*a*-303*e*). In the example, each plane has a pixel value of 70. Next, as shown at 306, the RIPped pixel value for the clear plane is reduced by a selected percentage. In this example, the clear plane pixel value is reduced to 10% of its original (306*a*). Then, as indicated at 309, the pixel values for each of the color planes are adjusted based on the ink limit, which, in this case, is 260%. In the example, each color plane has an adjusted pixel value of 63 (309*b*-309*e*). Note: the pixel value for the clear plane remains unchanged at 7 (309*a*). The adjusted pixel values may be saved as a compressed file, which is used for a first pass of the printer.

Figure 4:
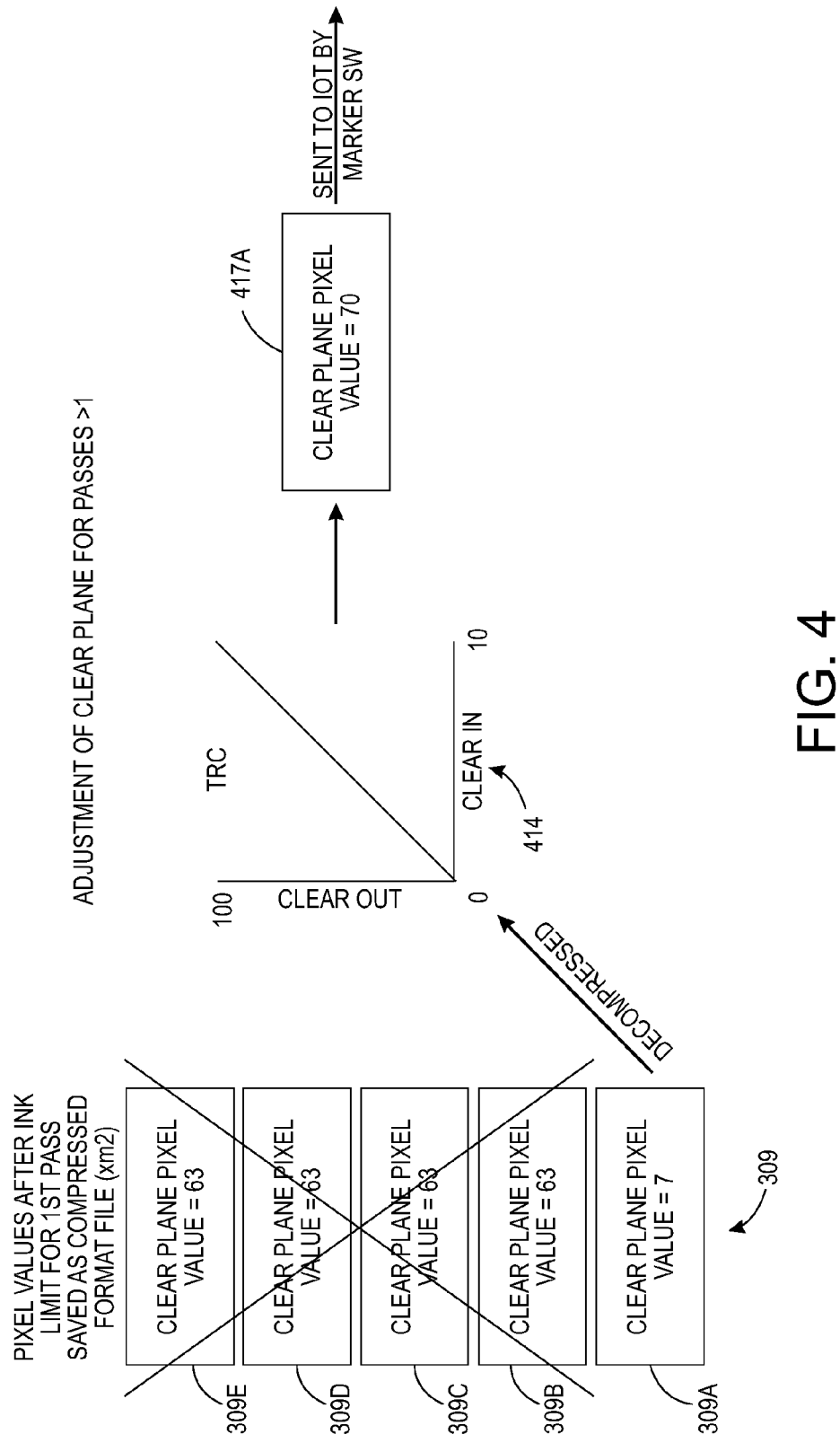
FIG. 4 is an illustration of the assembly of clear planes for subsequent passes of an image according to systems and methods herein.

Referring to FIG. 4, for printer passes after the first pass, a tone reproduction curve 414 is used to decompress the pixel value for the clear plane. (As shown in FIG. 4, the tone reproduction curve 414 may be linear; however, other shapes are contemplated.) In order to assure that only clear is used for subsequent passes, the pixel value for each color plane may be reduced to zero. The pixel value for the clear plane 417*a* is used for subsequent passes of the printer.

That is, as described above, a printing system comprises a multi-function device 100 having a controller/processor 104 that processes a print job according to an original print job description. The controller/processor 104 comprises an image processor component. The original print job description comprises multiple channels including a clear channel and at least one color channel. At least one print engine 107 is connected to the image processor portion of the controller/processor 104. The print engine 107 comprises a pigmented toner-applying component rendering a color layer on a media sheet and a clear toner-applying component rendering a clear layer on the media sheet. The image processor component determines toner usage per pixel for the color channel and the clear channel. The image processor component calculates adjusted pixel values for the clear channel by a predetermined percentage of clear toner. The image processor component calculates adjusted pixel values for the color channel based on maximum toner limit while retaining the predetermined percentage of clear toner. The controller/processor 104 processes instructions of the original print job description modifying pixel values of the color channel to zero and modifying pixel values for the clear channel by scaling the adjusted pixel values for the clear channel based on the predetermined percentage for clear toner on the first pass using a tone reproduction curve, such as 414, after an image is rendered onto the media sheet using the print engine 107 according to the original print job description.

Figure 5:
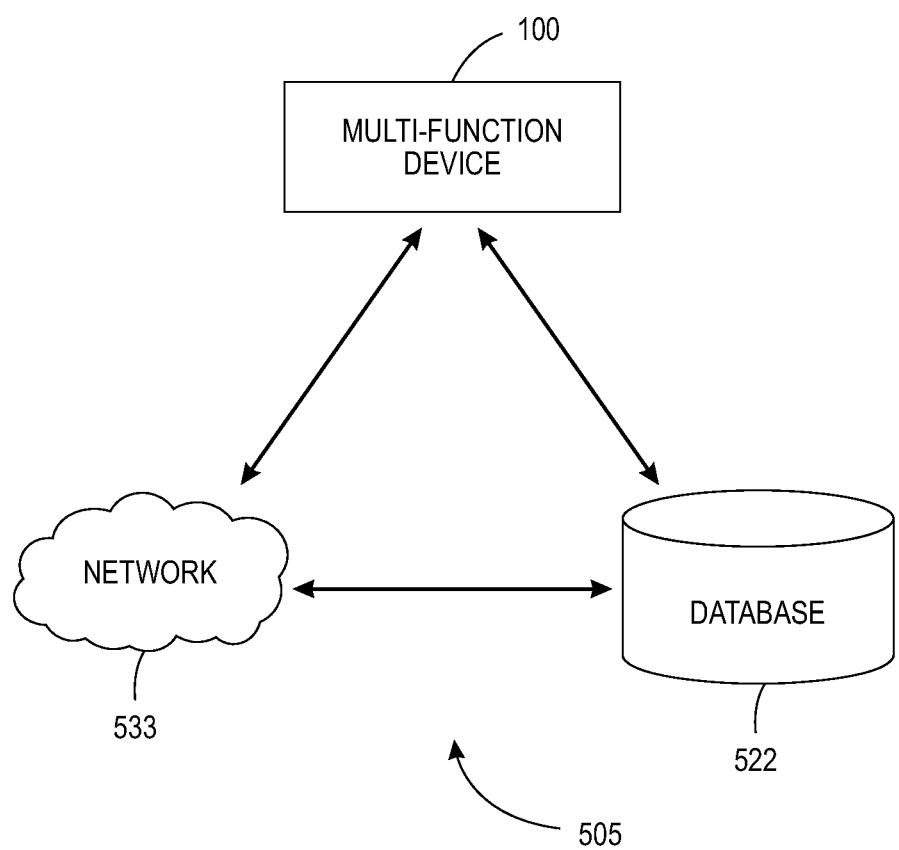
FIG. 5 is a block diagram of a network according to systems and methods herein.

FIG. 5 is a general overview block diagram of a network, indicated generally as 505, for communication between the multi-function device 100 and a database 522. The multi-function device 100 may comprise any form of processor as described in detail above. The multi-function device 100 can be programmed with appropriate application software to implement the methods described herein. Alternatively, the multi-function device 100 is a special purpose machine that is specialized for processing image data and includes a dedicated processor that would not operate like a general purpose processor because the dedicated processor has application specific integrated circuits (ASICs) that are specialized for the handling of image processing operations, processing pixel data, information for multi-pass operation documents, etc. In one example, the multi-function device 100 is special purpose machine that includes a specialized card having unique ASICs for providing image processing instructions, includes specialized boards having unique ASICs for input and output devices to speed network communications processing, a specialized ASIC processor that performs the logic of the methods described herein (such as the processing shown in FIG. 2) using dedicated unique hardware logic circuits, etc.

Database 522 includes any database or any set of records or data that the multi-function device 100 desires to retrieve. Database 522 may be any organized collection of data operating with any type of database management system. The database 522 may contain matrices of datasets comprising multi-relational data elements.

The database 522 may communicate with the multi-function device 100 directly. Alternatively, the database 522 may communicate with the multi-function device 100 over network 533. The network 533 comprises a communication network either internal or external, for affecting communication between the multi-function device 100 and the database 522. For example, network 533 may comprise a local area network (LAN) or a global computer network, such as the Internet.

Aspects of the present disclosure are described herein with reference to flowchart illustrations and/or block diagrams of methods, apparatus (systems), and computer program products according to various systems and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the processes/acts specified in the flowchart and/or block diagram block or blocks.

According to a further system and method herein, an article of manufacture is provided that includes a tangible computer readable medium having computer readable instructions embodied therein for performing the steps of the computer implemented methods, including, but not limited to, the method illustrated in FIG. 2. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 2.

The computer program instructions may be stored in a computer readable medium that can direct a computer, other programmable data processing apparatus, or other devices to process in a particular manner, such that the instructions stored in the computer readable medium produce an article of manufacture including instructions which implement the process/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the processes/acts specified in the flowchart and/or block diagram block or blocks.

In case of implementing the systems and methods herein by software and/or firmware, a program constituting the software may be installed into a computer with dedicated hardware, from a storage medium or a network, and the computer is capable of performing various processes if with various programs installed therein.

In the case where the above-described series of processing is implemented with software, the program that constitutes the software may be installed from a network such as the Internet or a storage medium such as the removable medium.

Those skilled in the art would appreciate that the storage medium is not limited to a peripheral device having the program stored therein, which is distributed separately from the device for providing the program to the user. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the computer storage medium may be a hard disk, or the like, which has the program stored therein and is distributed to the user together with the device that contains them.

The hardware described herein plays a significant part in permitting the foregoing method to be performed, rather than function solely as a mechanism for permitting a solution to be achieved more quickly, (i.e., through the utilization of a computer for performing calculations). Specifically, printers, scanners, and image processors that alter electronic documents each play a significant part in the methods (and the methods cannot be performed without these hardware elements). Therefore, these hardware components are fundamental to the methods being performed and are not merely for the purpose of allowing the same result to be achieved more quickly.

As would be understood by one ordinarily skilled in the art, the processes described herein cannot be performed by human alone (or one operating with a pen and a pad of paper) and instead such processes can only be performed by a machine. Specifically, processes such as printing, scanning, electronically altering documents using an image processor, etc., require the utilization of different specialized machines. Therefore, for example, the printing/scanning performed by the user device cannot be performed manually (because it can only be done by printing and scanning machines) and is integral with the processes performed by methods herein. In other words, these various machines are integral with the methods herein because the methods cannot be performed without the machines (and cannot be performed by humans alone).

Additionally, the methods herein solve many highly complex technological problems. For example, as mentioned above, in conventional systems that use clear toner, the color planes are reduced to enable 100% on the clear plane. This leads to a chromatic deficiency on the color printing as compared to printing color without clear toner. Methods herein solve this technological problem by reducing clear toner on the first pass and optimizing color printing on the first pass with optimal (100%) clear printing on subsequent passes.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a 'circuit', 'module, or 'system.' Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical process(es). It should also be noted that, in some alternative implementations, the processes noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified processes or acts, or combinations of special purpose hardware and computer instructions.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, processors, etc., are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the systems and methods described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, print engines, etc., are well known, and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

The terminology used herein is for the purpose of describing particular examples of the disclosed structures and methods and is not intended to be limiting of this disclosure. For example, as used herein, the singular forms 'a', 'an', and 'the' are intended to include the plural forms as well, unless the context clearly indicates otherwise. Additionally, as used herein, the terms 'comprises', 'comprising', and/or 'including', when used in this specification, specify the presence of stated features, integers, steps, operations, elements, and/or components, but do not preclude the presence or addition of one or more other features, integers, steps, operations, elements, components, and/or groups thereof. Further, the terms 'automated' or 'automatically' mean that once a process is started (by a machine or a user), one or more machines perform the process without further input from any user.

The corresponding structures, materials, acts, and equivalents of all means or step plus process elements in the claims below are intended to include any structure, material, or act for performing the process in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and processes, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the systems and methods herein should not be implied or imported from any above example as limitations to any particular order, number, position, size, shape, angle, color, temperature, or material.

What is claimed is:

1. A method comprising:
  receiving a print job into a print engine comprising an image processor, said print engine using a color gamut and a clear toner;
  analyzing, by said image processor, a page of said print job for said color gamut and for said clear toner, said analyzing comprising:
    determining the number of passes of said page through said print engine for said print job, for print jobs having more than one pass:
      determining toner usage per pixel for each color of said color gamut and said clear toner,
      calculating adjusted pixel values for clear toner usage per pixel by a predetermined percentage of clear toner, and
      calculating adjusted pixel values for color toner usage per pixel for each color of said color gamut based on maximum toner limit while retaining said predetermined percentage of clear toner;
  rendering a first layer of said page of said print job on a media sheet in a first pass using said adjusted pixel values for said clear toner usage and said adjusted pixel values for said color toner usage; and
  for print jobs having more than one pass:
    determining scaled pixel values for clear toner usage by scaling said adjusted pixel values for clear toner usage based on said predetermined percentage for clear toner usage on said first pass using a tone reproduction curve, and
    rendering subsequent layers of said page of said print job on said media sheet in a select pass using only said scaled pixel values for clear toner usage.

2. The method according to claim 1, said image processor comprising a raster image processor.

3. The method according to claim 1, said color gamut comprising CMYK or CMYK with a color extension.

4. The method according to claim 1, said scaling said adjusted pixel values for clear toner usage comprising using a tone reproduction curve.

5. The method according to claim 1, further comprising:
  after said analyzing said page of said print job for said color gamut and for said clear toner, generating a ready-to-print file; and
  sending said ready-to-print file to said print engine.

6. The method according to claim 5, further comprising:
  after said rendering said first layer of said page of said print job on said media sheet, returning said page to said print engine for at least one additional layer of said clear toner being rendered on a same side of said media sheet.

7. The method according to claim 1, further comprising:
  after said scaling said adjusted pixel values for clear toner usage, generating a modified ready-to-print file using said adjusted pixel values for said clear toner;
  saving said modified ready-to-print file in a modified ready-to-print format; and
  sending said modified ready-to-print file to said print engine.

8. The method according to claim 7, further comprising:
  modifying values for said color toner usage by adjusting pixel values for color toner usage to zero.

9. A method, comprising:
  receiving an original print job description comprising multiple channels including a clear channel and a color channel, said original print job indicating multi-pass operation;
  performing image processing on said print job description to generate a ready-to-print file, said image processing comprising:
    determining toner usage per pixel for said color channel and said clear channel,
    calculating adjusted pixel values for said clear channel by a predetermined percentage of clear toner, and
    calculating adjusted pixel values for said color channel based on maximum toner limit while retaining said predetermined percentage of clear toner;
  rendering a first layer of an image on a media sheet in a first pass using said adjusted pixel values for said clear channel and said adjusted pixel values for said color channel;
  modifying pixel values of said color channel to zero;
  modifying pixel values for said clear channel by scaling said adjusted pixel values for said clear channel based on said predetermined percentage for clear toner on said first pass using a tone reproduction curve;
  generating a modified ready-to-print file using modified pixel values of said color channel and modified pixel values of said clear channel;
  saving said modified ready-to-print file in a modified ready-to-print format; and
  rendering subsequent layers of said image on said media sheet in a select pass using only said clear channel according to said modified ready-to-print format.

10. The method according to claim 9, said performing image processing comprising raster image processing on an image in said print job description.

11. The method according to claim 9, said color channel comprising CMYK color gamut or CMYK with a color extension.

12. The method according to claim 9, said rendering said first layer of said image on said media sheet further comprising sending said ready-to-print file to a print engine.

13. The method according to claim 12, further comprising:
after said rendering said first layer on said media sheet, returning said media sheet to said print engine for at least one additional layer using said clear channel, said subsequent layer being rendered on a same side of said media sheet.

14. The method according to claim 9, further comprising:
after said saving said modified ready-to-print file in a modified ready-to-print format, sending said modified ready-to-print file to said print engine.

15. A printing system, comprising:
a processor processing a print job according to an original print job description, said processor comprising an image processor component, said original print job description comprising multiple channels including a clear channel and a color channel; and
a print engine connected to said image processor, said print engine comprising:
a pigmented toner applying component rendering a color layer on a media sheet, and
a clear toner applying component rendering a clear layer on said media sheet, said image processor component:
determining toner usage per pixel for said color channel and said clear channel,
calculating adjusted pixel values for said clear channel by a predetermined percentage of clear toner, and
calculating adjusted pixel values for said color channel based on maximum toner limit while retaining said predetermined percentage of clear toner, and
said processor processing instructions of said original print job description modifying pixel values of said color channel to zero and modifying pixel values for said clear channel by scaling said adjusted pixel values for said clear channel based on said predetermined percentage for clear toner on a first pass using a tone reproduction curve after an image is rendered onto said media sheet using said print engine according to said original print job description.

16. The printing system according to claim 15, said color channel comprising a CMYK color gamut or CMYK with a color extension.

17. The printing system according to claim 15, said image processor comprising a raster image processor.

18. The printing system according to claim 15, further comprising:
a media path delivering said media sheet to said print engine; and
a return paper path delivering said media sheet to said clear toner applying component for at least one additional layer of a clear layer being rendered on a same side of said media sheet.

19. The printing system according to claim 15, further comprising:
a computer storage medium, said processor generating a modified ready-to-print file using modified pixel values of said color channel and modified pixel values of said clear channel and saving said modified ready-to-print file in said computer storage medium.

20. The printing system according to claim 15, further comprising:
an image input source receiving said original print job description.

* * * * *